(12) United States Patent
Lee et al.

(10) Patent No.: US 11,745,721 B2
(45) Date of Patent: Sep. 5, 2023

(54) METHOD OF CONTROLLING ELECTRIC OIL PUMP FOR VEHICLE

(71) Applicants: Hyundai Motor Company, Seoul (KR); Kia Corporation, Seoul (KR)

(72) Inventors: Jae Hyeon Lee, Hwaseong-si (KR); Jae Woo Shim, Anyang-si (KR); Ji Wan Cha, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 275 days.

(21) Appl. No.: 17/316,173

(22) Filed: May 10, 2021

(65) Prior Publication Data
US 2022/0055603 A1    Feb. 24, 2022

(30) Foreign Application Priority Data

Aug. 18, 2020 (KR) .......................... 10-2020-0103295

(51) Int. Cl.
*B60W 10/30* (2006.01)
*F16H 61/00* (2006.01)

(52) U.S. Cl.
CPC ......... *B60W 10/30* (2013.01); *F16H 61/0028* (2013.01); *B60W 2710/1083* (2013.01)

(58) Field of Classification Search
CPC ........... B60W 10/30; B60W 2710/088; B60W 2710/1083; B60W 2710/1088; F16H 1/0028; F16H 1/0031
See application file for complete search history.

(56) References Cited

U.S. PATENT DOCUMENTS

| | | | |
|---|---|---|---|
| 6,318,332 B1 * | 11/2001 | Kern .................... | F01M 1/18 123/196 R |
| 9,718,464 B2 * | 8/2017 | Inoue .................... | B60W 10/10 |
| 2010/0187042 A1 * | 7/2010 | Murahashi .......... | F16H 57/0434 184/6.3 |
| 2010/0187043 A1 * | 7/2010 | Murahashi .......... | F16H 57/0434 184/6.3 |
| 2012/0135841 A1 * | 5/2012 | Watanabe ............ | B60W 10/115 477/115 |
| 2015/0367793 A1 * | 12/2015 | Ishikawa ................ | B60R 17/02 903/917 |
| 2016/0025212 A1 * | 1/2016 | Kawamoto ......... | F16H 61/0031 701/102 |

(Continued)

FOREIGN PATENT DOCUMENTS

KR    10-1786704 B1    10/2017

*Primary Examiner* — Jeffrey J Restifo
(74) *Attorney, Agent, or Firm* — MORGAN, LEWIS & BOCKIUS LLP

(57) ABSTRACT

A method of controlling an electric oil pump configured for a vehicle, may include a step of determining whether a vehicle has entered a sloped road, a step of determining whether a drive motor of the vehicle is in one or more overheatable conditions when it is determined that the vehicle has entered a sloped road, a step of determining whether the overheatable condition is maintained over a preset reference time when it is determined that the vehicle is in the over-heatable condition; and a step of supplying a pulse to an RPM input for the electric oil pump when it is determined that the duration of the over-heatable condition exceeds the preset reference time.

20 Claims, 10 Drawing Sheets

(56) References Cited

U.S. PATENT DOCUMENTS

| | | | |
|---|---|---|---|
| 2016/0176392 A1* | 6/2016 | Murata | B60W 50/06 |
| | | | 903/902 |
| 2019/0242279 A1* | 8/2019 | Dudar | F01M 1/02 |
| 2020/0032900 A1* | 1/2020 | Tokoi | F16H 61/66272 |
| 2020/0240512 A1* | 7/2020 | Yashiro | F01M 5/00 |
| 2022/0055603 A1* | 2/2022 | Lee | F04B 49/20 |

* cited by examiner

METHOD OF CONTROLLING ELECTRIC OIL PUMP FOR VEHICLE

CROSS-REFERENCE TO RELATED APPLICATION

The present application claims priority to Korean Patent Application No. 10-2020-0103295, filed Aug. 18, 2020, the entire contents of which is incorporated herein for all purposes by this reference.

BACKGROUND OF THE INVENTION

Field of the Invention

The present invention relates to a method of controlling an electric oil pump of a vehicle. More particularly, the present invention relates to a method of controlling an electric oil pump for an eco-friendly vehicle, the pump being capable of more effectively cooling a drive motor of the vehicle especially when the vehicle runs on a sloped road.

Description of Related art

"Eco-friendly Vehicle (EV)" is a collective term for vehicles mounted with a rechargeable high-voltage large capacity battery, including a hybrid electric vehicle (HEV), a plug-in hybrid electric vehicle (PHEV), a fuel cell electric vehicle (FCEV), and the like.

A drive motor plays a major role in driving the eco-friendly vehicle. The drive motor has an efficiency of about 90% due to loss caused by heat, wind, sound, etc. Heat loss, which accounts for about 25% of the total loss, occurs when the temperature of the drive motor is increased. In case the drive motor is heated over a threshold temperature which is an upper limit of a stable operating temperature of the drive motor, the drive motor is overheated and burning of coils around a stator of the drive motor or demagnetization of a permanent magnet in a rotor may occur. Consequently, an appropriate cooling system is being provided in the drive motor such that the drive motor operates below the threshold temperature.

A drive motor may be cooled by water, air or oil depending on a type of cooling fluids. Also, the drive motor may be cooled directly or indirectly based on presence of contact. Recently, direct cooling using oil is increasingly utilized in cooling the drive motor as importance in cooling capacity of the drive motor grows with increasing demand in high-performance drive motors. Oil as coolant is pumped by an electric oil pump (EOP). As EOP logic that determines the feed rate of oil is directly related to the performance of a motor cooling system, developing EOP logic that can determine feed rates of oil optimal in each situation is crucial.

The EOP's oil feed rate depends on temperatures measured by temperature sensors. The temperature sensors may be positioned on a coil of the drive motor or at an oil feeding port of the EOP. The temperature sensor for the drive motor is provided in an area of the coil where cooling is the weakest. Referring to FIG. 1, the weakest cooling area is usually found in a portion of the coil C, located at the 6 o'clock position of the drive motor as indicated by $H_1$.

When increases in the temperature of the drive motor, the temperature of the oil, or change in temperature with time are detected, the EOP is controlled to increase the feed rate of oil to improve the cooling performance. The oil pumped by the EOP flows along a predetermined path $L_1$, represented by a dotted line, in an agglomerated state due to high viscosity of the oil. The region $H_1$ which is not on the path $L_1$ becomes a high temperature region. Therefore, a temperature sensor T is disposed at the six o'clock position of the drive motor, and a representative temperature at which steps to protect the drive motor are taken is measured at the six o'clock position of the drive motor.

When a vehicle travels on a flat road, it is satisfactory to measure the temperature of the drive motor in the six o'clock area of the drive motor, indicated by $H_1$. However, when a vehicle travels on a sloped road like downhill or uphill, the weakest cooling area of the drive motor may change. That is, it may not be at the six o'clock area $H_1$. Therefore, it is necessary to take a measure for improving a cooling performance in the weakest cooling area of a drive motor when a vehicle travels on a sloped road.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method of controlling an electric oil pump configured for a vehicle, the method being configured for improving a cooling performance with respect to a weak cooling area in a drive motor.

Various aspects of the present invention are to provide a method of controlling an electric oil pump configured for a vehicle, the method being configured for improving an operation performance of a vehicle.

A further objective of the present invention is directed to providing a method of controlling an electric oil pump configured for a vehicle, the method being configured for ensuring safety of a drive motor by preventing overheat-induced damage and demagnetization that occur in the drive motor when the vehicle is traveling on a sloped road.

A yet further objective of the present invention is directed to providing a method of controlling an electric oil pump configured for a vehicle, the method being configured for reducing costs for a vehicle.

It is to be understood that the objectives of the present invention are not limited to the above-mentioned ones, and other objectives which are not mentioned above may be understood from the following description by those skilled in the art to which various exemplary embodiments of the present invention pertains.

The features of the present invention for achieving the objectives described above and for performing characteristic functions of the present invention are described below.

According to various aspects of the present invention, a method of controlling an electric oil pump configured for a vehicle includes: determining whether the vehicle has entered a sloped road greater than a predetermined slope; determining whether a drive motor of the vehicle is in none or more over-heatable conditions upon determining that the vehicle has entered a sloped road greater than a predetermined slope; determining whether the overheatable condition is maintained over a preset reference time when it is determined the vehicle is in the over-heatable condition; and supplying a pulse to an RPM input of the electric oil pump when it is determined that the duration of the over-heatable condition exceeds the preset reference time.

According to various exemplary embodiments of the present invention, in the EOP control method, the EOP is controlled to supply cooling oil at a variable feed rate rather than a fixed feed rate. That is, the EOP's feed rate changes with time in a form of a sine wave or a square wave, changing the oil flow path and causing pulsation which makes oil supplied throughout the entire region of the drive motor. With the present control method, it is possible to improve the cooling performance even in a weak cooling area of the drive motor.

Furthermore, according to various exemplary embodiments of the present invention, the method can make the drive motor free of derating by improving the cooling performance in the weak cooling area of the drive motor, ensuring more stable and improved driving performance of a vehicle.

The method according to various exemplary embodiments of the present invention can eliminate risks of local overheating damage of the coils and demagnetization of the permanent magnet of the drive motor when a weak cooling area moves while a vehicle is driving on a sloped road, improving safety of the vehicle.

Furthermore, the method according to various exemplary embodiments of the present invention can prevent overheating damage of the drive motor without requiring an additional temperature sensor to be provided in a weak cooling area in a situation in which the vehicle drives on a sloped road, reducing the costs of the vehicle.

The effects of the present invention are not limited to those described above, and other effects not mentioned will be clearly recognized by those skilled in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
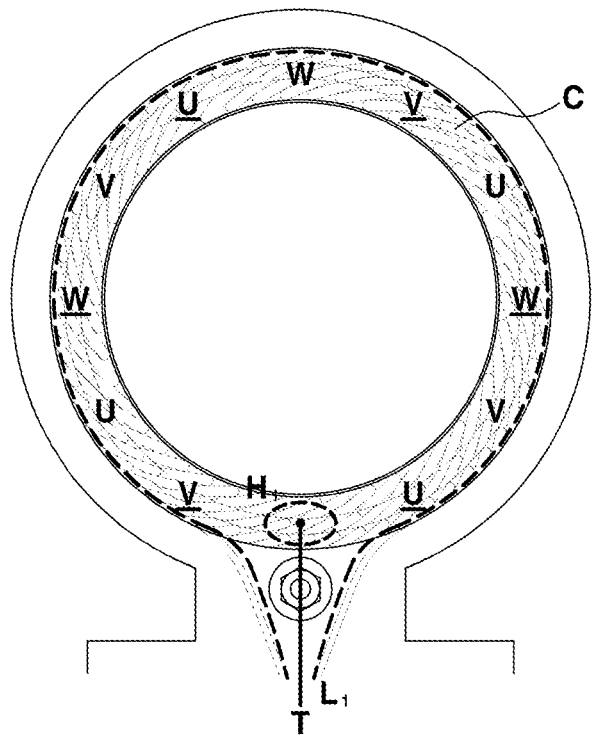
FIG. 1 is a view exemplarily illustrating a drive motor configured for a vehicle and a flow path of cooling oil.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it may be understood that they may not be construed as being limited to the exemplary embodiments described in the exemplary embodiment, but include all of modifications, equivalents, or substitutes included in the spirit and scope of the present invention.

It will be understood that, although the terms "first," "second," etc. may be used herein to describe various elements, these elements may not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it may be understood that when an element is referred to as being "directly coupled" or "directly connected" to another element, there are no intervening elements present. Other expressions that explain the relationship between elements, such as "between," "directly between," "adjacent to," or "directly adjacent to," may be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the exemplary embodiment, specify the presence of stated components, steps, operations, or elements, but do not preclude the presence or addition of one or more other components, steps, operations, or elements thereof.

Hereinafter, the present invention will be described in detail with reference to the accompanying drawings.

As previously described in Background, it is preferable to use the temperature measured in the six o'clock area H1 where cooling is weak as the basis for determination of the feed rate of an electronic oil pump (EOP). However, since the weak cooling area may change when a vehicle travels on a sloped road, the base temperature for determining the feed rate needs to be corrected.

Figure 2A:
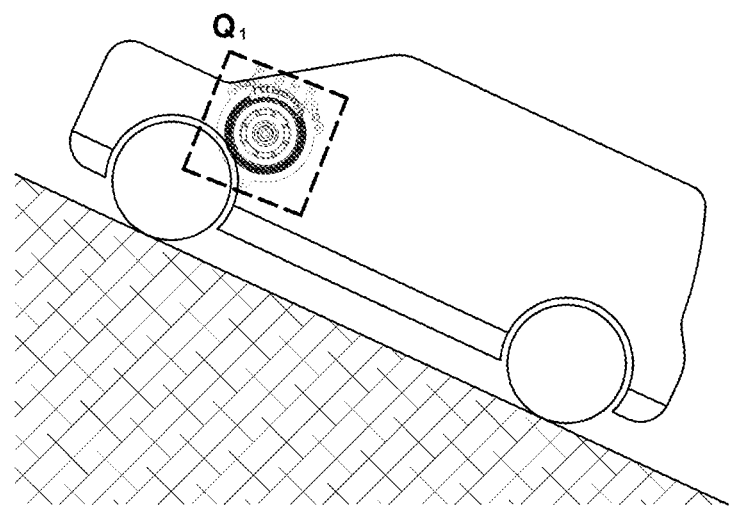
FIG. 2A is a view exemplarily illustrating a position of a drive motor in a vehicle when a vehicle drives on an uphill sloped road.
Figure 2B:
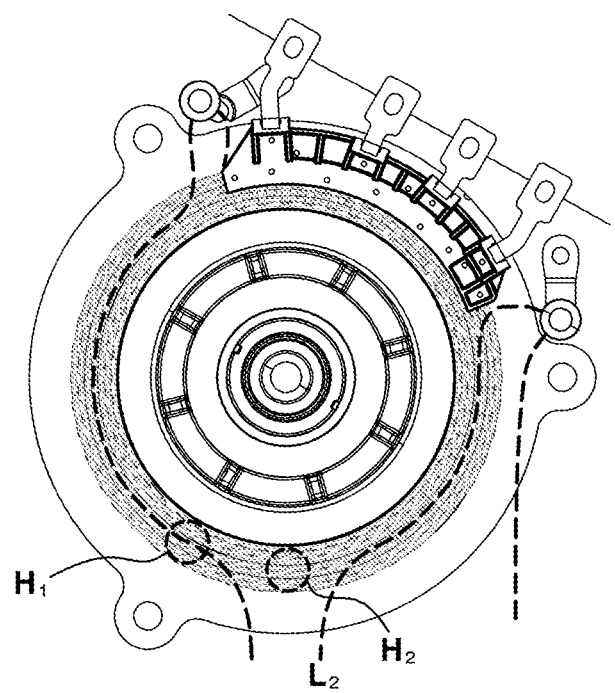
FIG. 2B is an enlarged view of a portion denoted by Q1 in FIG. 2A.
Figure 3A:
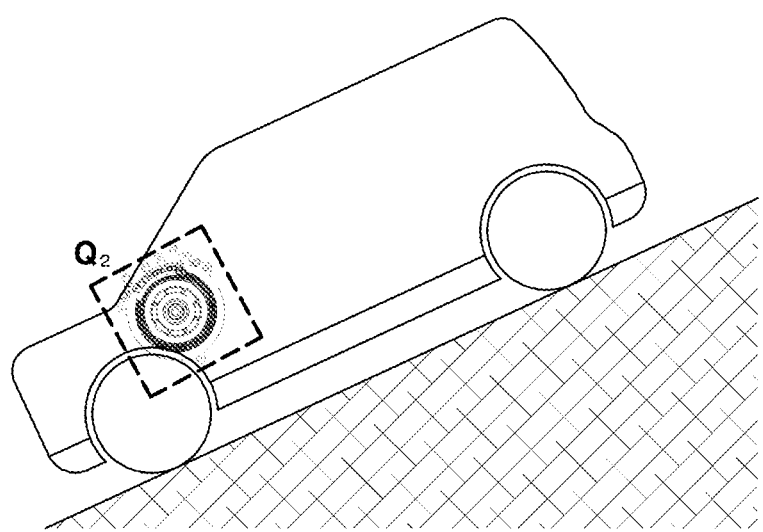
FIG. 3A is a view exemplarily illustrating a position of a drive motor in a vehicle when a vehicle drives on a downhill sloped road.
Figure 3B:
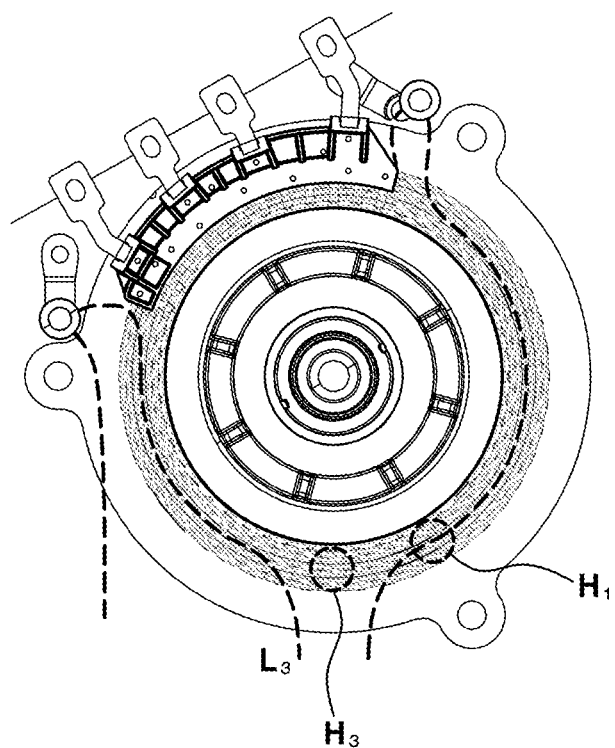
FIG. 3B is an enlarged view exemplarily illustrating a portion denoted by Q2 in FIG. 3A.

When a vehicle is on a sloped road, an oil flow path varies depending on an inclination angle of the sloped road, and the position of a weak cooling area changes. In case where a vehicle moves on an uphill, a weak cooling area may not be the area $H_1$ but may be an area $H_2$ because the oil flow path changes from a path $L_1$ to a path $L_2$ (See FIG. 2A and FIG. 2B). In a case of a downhill, the oil flow path changes from the path $L_1$ to a path $L_3$, and the weak cooling area may not be the area $H_1$ but may be an area $H_3$ (See FIG. 3A and FIG. 3B).

Figure 4:
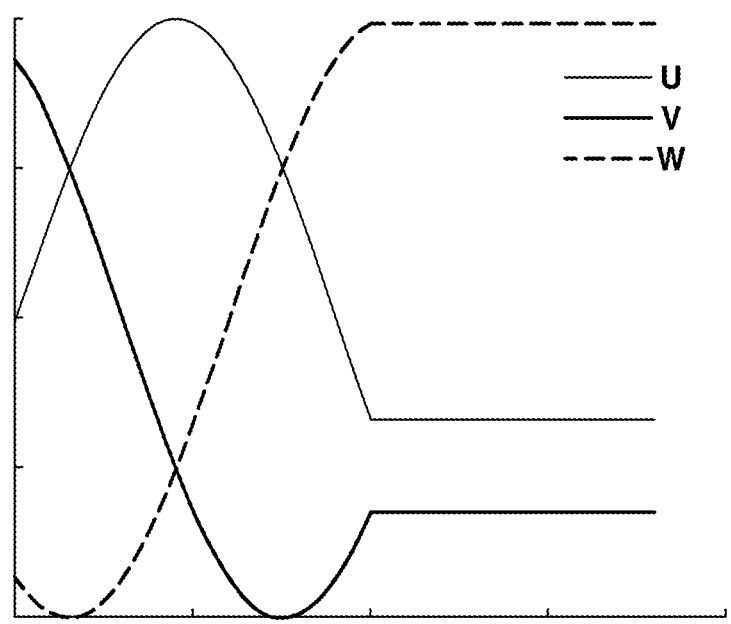
FIG. 4 is a view exemplarily illustrating waveforms of a drive current of each phase in the Hill-Hold state.

In these cases, a temperature sensor T positioned in the six o'clock area $H_1$ cannot measure the temperature of the area $H_2$ or the area $H_3$ which may have the highest temperature in the drive motor 100. Then over-temperature protection logic designed for the drive motor 100 may fail to come into action, and burning of the drive motor 100 may happen at a high current operating point while driving on a sloped road or in a Hill-Hold situation. The Hill-Hold situation refers to a case where a fixed current is applied to the coils of each phase in the drive motor 100, as depicted in FIG. 4.

According to various exemplary embodiments of the present invention, provided is a method of controlling an electric oil pump of a vehicle. The method can improve cooling of a weak cooling area that varies according to a driving condition, for example, when a vehicle is driven on a sloped road.

Figure 5:
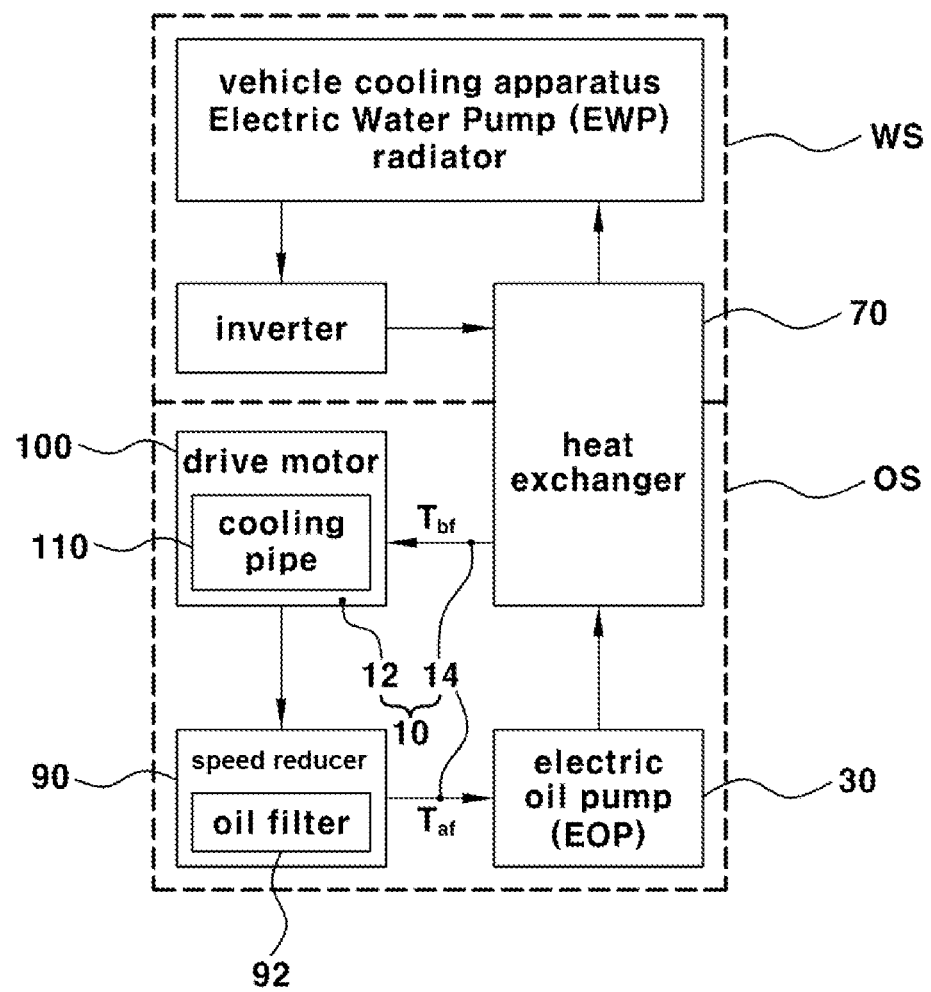
FIG. 5 is a block diagram illustrating the construction of an oil cooling system used for an electric oil pump control method according to various exemplary embodiments of the present invention.
Figure 6:
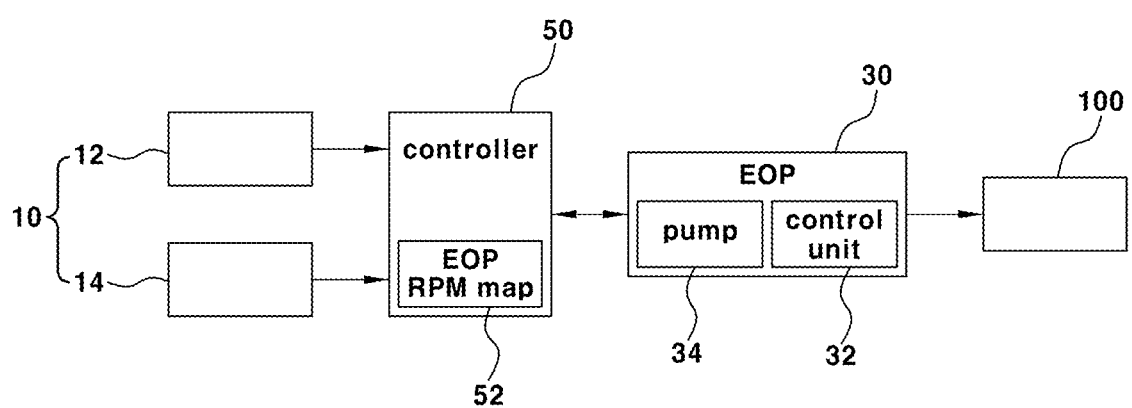
FIG. 6 is a block diagram illustrating a drive motor cooling process to describe the electric oil pump control method according to various exemplary embodiments of the present invention.

Referring to FIG. 5 and FIG. 6, according to various exemplary embodiments of the present invention, an oil cooling system (OS) of an eco-friendly vehicle operates in conjunction with a water cooling system (WS).

The oil cooling system (OS) includes a temperature sensor 10, and the temperature sensor 10 includes a drive motor temperature sensor 12 and an oil temperature sensor 14. As described before, the drive motor temperature sensor 12 is provided in an area where cooling is weakest in the drive motor 100, e.g., at a six o'clock position in the drive motor 100. The oil temperature sensor 14 may include an oil temperature sensor 14 measuring the temperature $T_{bf}$ of oil before the oil enters the drive motor 100 and an oil temperature sensor 14 measuring the temperature $T_{af}$ of oil that returns to the EOP 30 after circulating through the drive motor. As the temperature sensor 10, a negative temperature coefficient (NTC) type sensor or a positive temperature coefficient (PTC) type sensor may be used. The NTC type sensor and the PTC type sensor are based on the principle that the resistance changes with temperature.

A controller 50 receives measurements from the temperature sensor 10 and determines oil flow and ejection pressure of the oil on the measured temperature. In other words, the controller 50 determines RPM (revolutions per minute) of the EOP 30 according to the temperature received from the temperature sensor 10. The controller 50 has an RPM map 52 of the EOP 30. The RPM map 52 is provided in advance, based on variables including the temperature of the drive motor 100, the temperature of oil, and the temperature changes in time. The controller 50 determines a specific RPM value with respect to the measured temperature from the RPM map 52 and transmits the specific RPM value to the EOP 30. In turn, the EOP 30 is operated at the specific RPM value in accordance with the command from the controller 50. The EOP 30 includes a control unit 32 rotating a pump 34 at the specific RPM value instructed by the controller 50. The control unit 32 may transfer information on actual RPM values and failure of the EOP 30 to the controller 50.

The oil pumped by the EOP 30 is cooled by exchanging heat with low-temperature cooling water in a heat exchanger 70. The oil cooled to a temperature of $T_{bf}$ is ejected from a cooling pipe 110 to the drive motor 100 by the pressure of the EOP 30, cooling the drive motor 100.

After cooling the drive motor 100, the oil removes impurities from itself by passing an oil filter 92 included in a speed reducer 90. The filtered oil returns to the EOP 30, and the oil repeats recirculation as described above.

According to the EOP RPM map 52, the EOP 30 is configured to run at a higher RPM as temperature of the oil or the drive motor 100 increases such that an increased amount of oil is supplied to the drive motor 100. As the amount of oil supplied by the EOP 30 increases, the contact area between the oil and a heat generating portion of the drive motor 100 increases, cooling the drive motor 100 at a rapider rate.

The weak cooling area may be changed from $H_1$ to $H_2$ or to $H_3$ when a vehicle is driven on a sloped road. Therefore, the present invention utilizes additional EOP control logic to provide sufficient cooling performance even in the weak cooling area when a vehicle is in motion on a sloped road. The additional EOP control logic may be included in the EOP RPM map 52.

Figure 7:
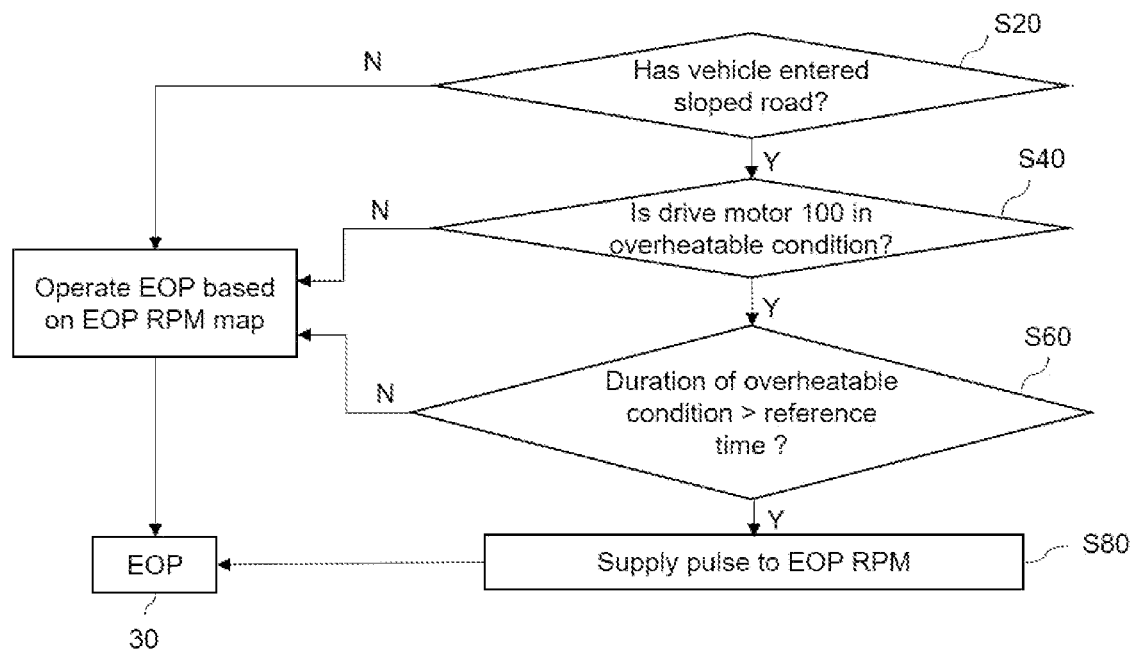
FIG. 7 is a flowchart illustrating a method of controlling an electric oil pump, according to various exemplary embodiments of the present invention.

Referring to the FIG. 7, a method of controlling an electric oil pump according to various exemplary embodiments of the present invention will be described. First, the method determines whether a predetermined condition is met to determine whether to employ an additional EOP operation.

According to various exemplary embodiments of the present invention, one of the predetermined conditions may be a condition in which a vehicle runs on a sloped road. The controller 50 determines whether a vehicle is on a sloped road (Step S20) to determine whether an additional operation of the EOP is required.

The vehicle being on a sloped road may be detected by measuring an inclination angle of the vehicle, i.e., an inclination angle between the vehicle and a horizontal line. Alternatively, it may be determined that the vehicle is on a sloped road by use of known methods, e.g., an acceleration sensor. When the inclination angle measured with the acceleration sensor or the like exceeds a preset reference inclination angle, the controller 50 determines that the vehicle has entered a sloped road.

When it is determined that the vehicle is driven on a sloped road, the controller is configured to determine whether the drive motor 100 is under an overheatable condition (Step S40). In the exemplary embodiment, the term "overheatable condition" or "potential overheating condition" is defined as a condition required to introduce the control method according to various exemplary embodiments of the present invention.

Figure 8:
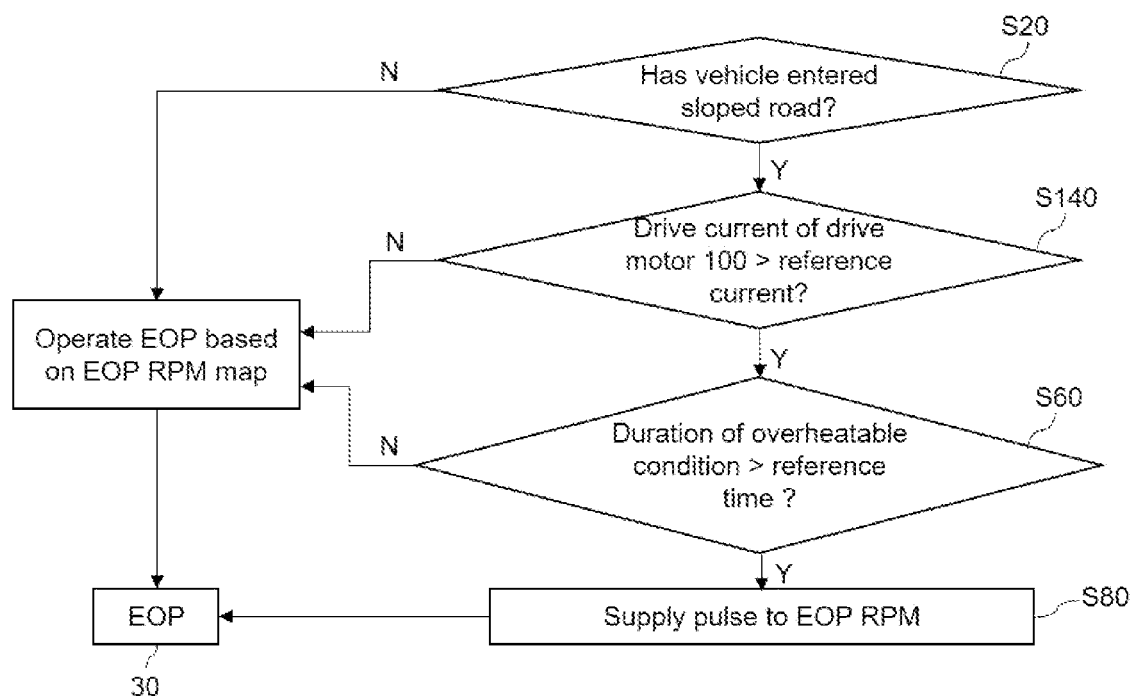
FIG. 8 is a flowchart illustrating a method of controlling an electric oil pump, according to various exemplary embodiments of the present invention.

Referring to FIG. 8, according to various exemplary embodiments of the present invention, the overheatable condition includes a state in which a drive current of the drive motor 100 exceeds a preset reference current (Step S140). The controller 50 receives a present drive current of the drive motor 100 and compares the present drive current with the reference current to determine whether the drive motor of the vehicle is in the overheatable condition.

If, for example, the drive motor corresponds to a three-phase drive motor including three-phase coils u, v, and w, the overheatable condition includes a state in which a maximum current value of three phase currents exceeds the preset reference current.

Figure 9:
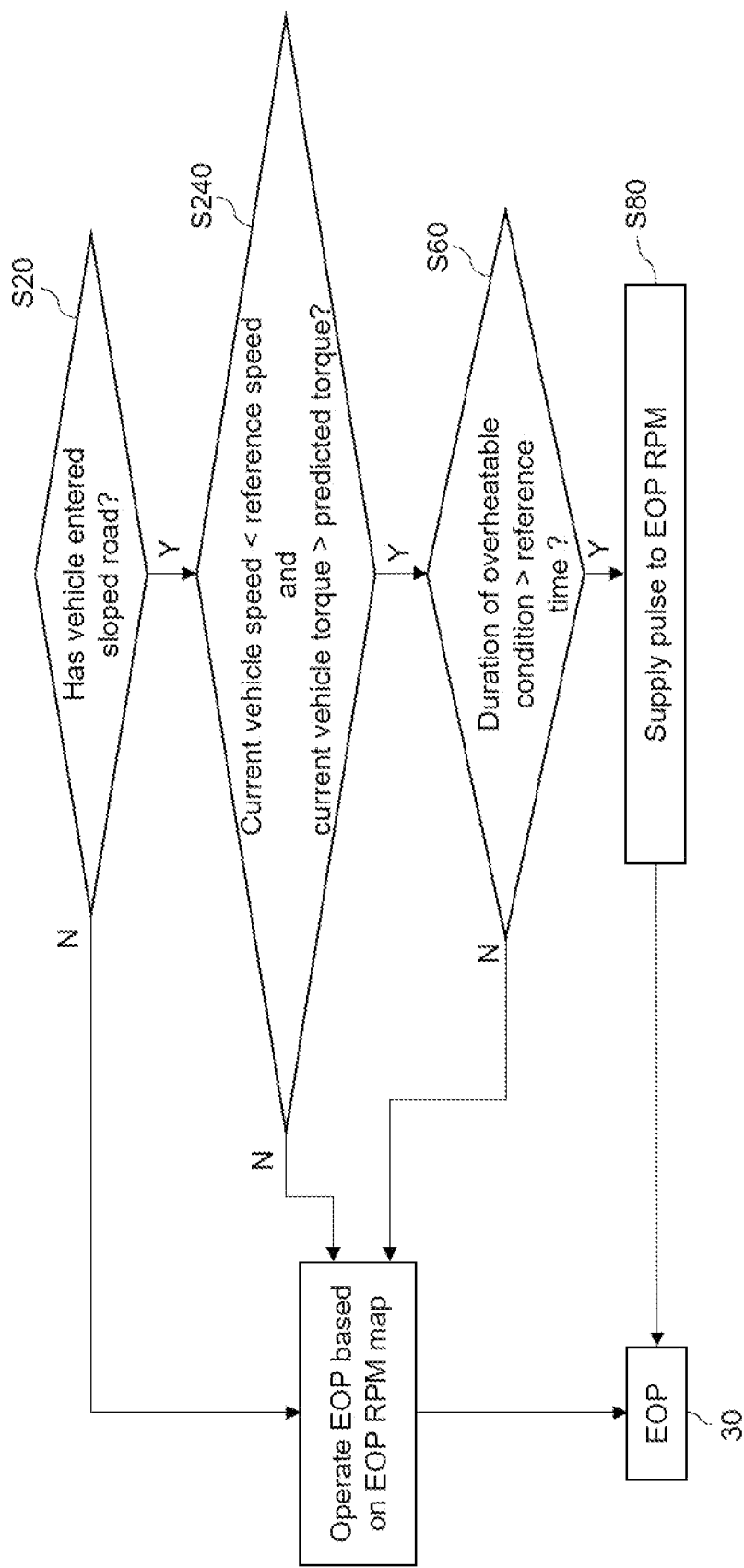
FIG. 9 is a flowchart illustrating a method of controlling an electric oil pump, according to various exemplary embodiments of the present invention.

As depicted in FIG. 9, according to various exemplary embodiments of the present invention, it may be determined that the drive motor of a vehicle is in the overheatable condition by comparing a current speed of the vehicle with a current torque of the vehicle The drive motor 100 may be regarded as being in the overheatable condition when the current speed of the vehicle is under a certain speed and the current torque of the vehicle exceeds an expected torque which is reasonable at the current speed of the vehicle (Step S240). The controller 50 may determine whether the drive motor of the vehicle is in the overheatable condition by comparing the current torque of the vehicle and the expected torque corresponding to the current speed of the vehicle.

Figure 10:
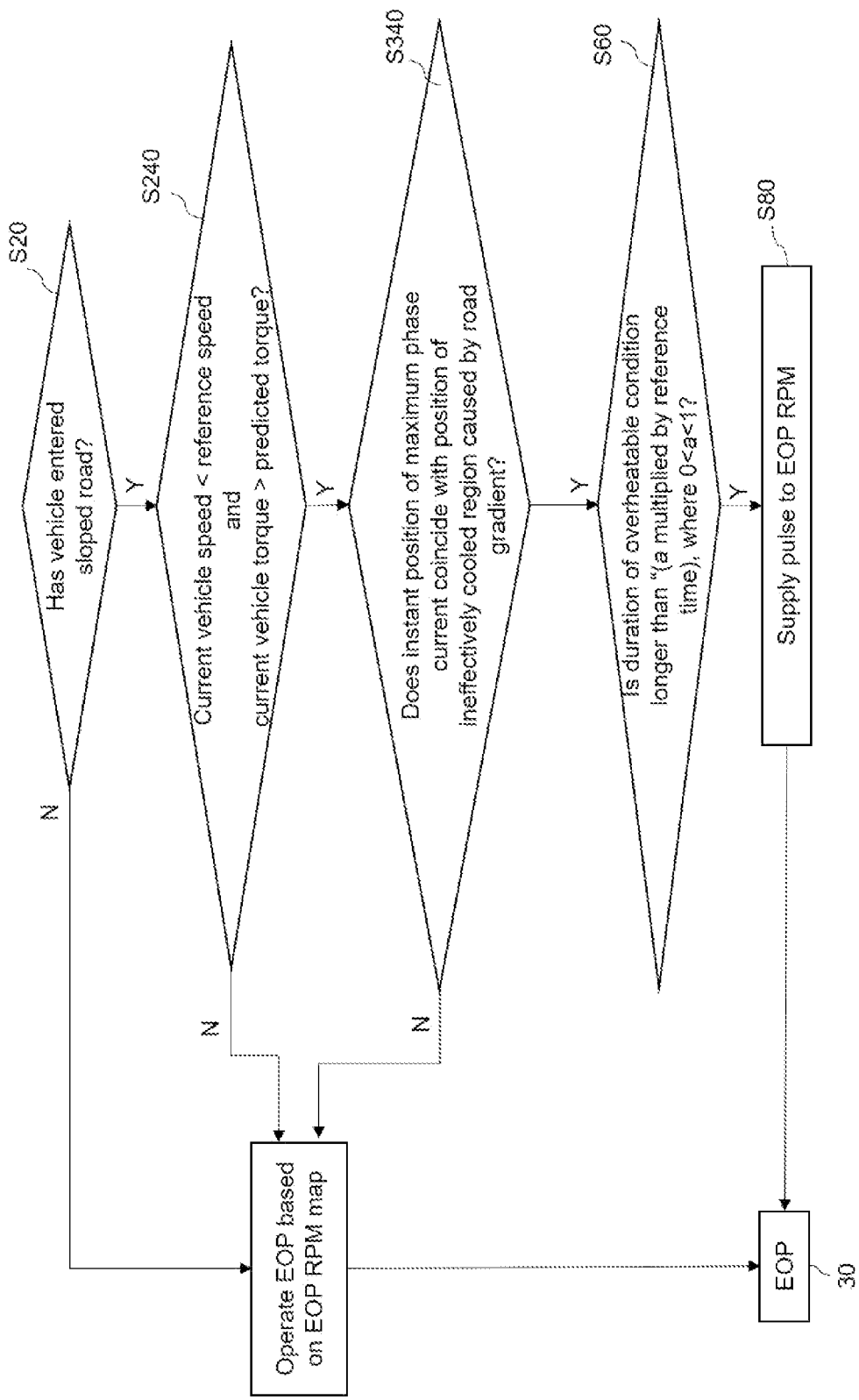
FIG. 10 is a flowchart illustrating a method of controlling an electric oil pump, according to various exemplary embodiments of the present invention.

As illustrated in FIG. 10, according to various exemplary embodiments of the present invention, the controller 50 determines whether a location of a coil having a maximum phase current among the coils wound around the drive motor coincides with a location of a weakly cooled area caused by the vehicle being on a sloped road (Step S340). When both locations coincide with each other, the drive motor is regarded as highly likely being in the overheatable condition. In the instant case, a preset reference time period which will be described later may be reduced. The reduced reference time is reset to be smaller than a reference time which is initially set and to be greater than 0. For instance, the reference time may be a half of the reference time period which is initially set.

Referring again to FIGS. 7 or 9, when it is determined that the drive motor of the vehicle is in the overheatable condition, the controller 50 further determines that a duration of the overheatable condition exceeds the preset reference time. In other words, it is determined that the overheatable condition lasts for a time period that exceeds the preset reference time (Step S60). For example, it is determined whether a time period during which the drive current of the drive motor 100 exceeds the reference current is maintained over the preset reference time. Alternatively, determined is a time period during which the current speed of the vehicle is less than the preset reference speed while the current torque of the vehicle exceeds the expected torque which is an estimated torque at a specific speed.

According to various exemplary embodiments of the present invention, a certain time period is defined as one cycle and a reference number of cycles is set. For example, one cycle may be set to ten milliseconds and the reference number of cycles may be set to 300. In the instant case, when the overheatable condition lasts for more than 3 seconds, it is determined that an additional EOP control is required.

When it is determined that the duration of the overheatable condition exceeds the reference time, the controller 50 changes the RPM of the EOP 30 (Step S80). That is, a pulse is applied to the input of the RPM of the EOP according to the EOP RPM map 52.

Figure 11:
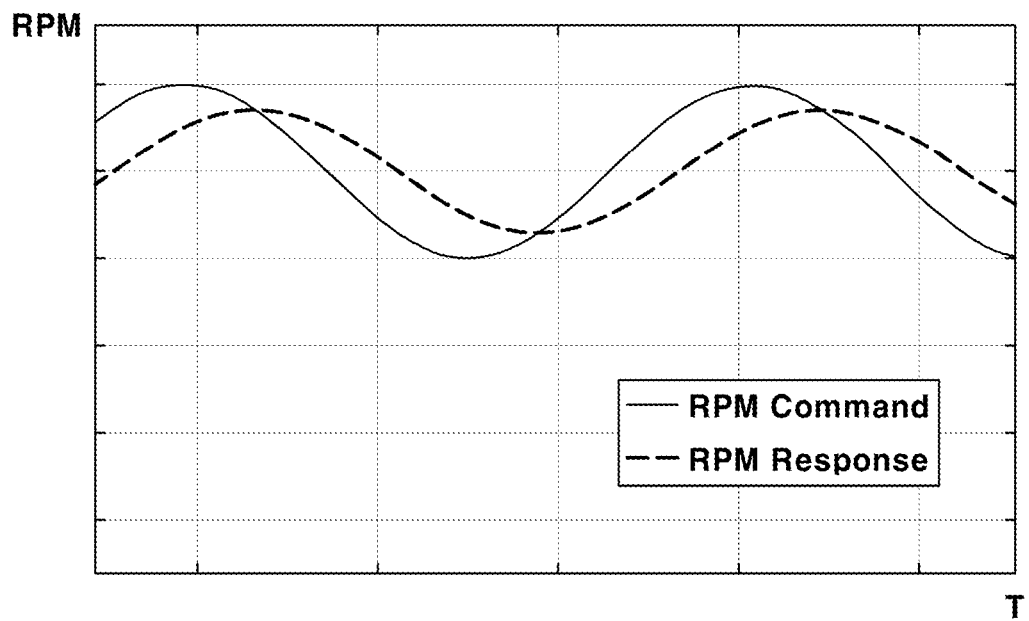
FIG. 11 is a pulsation graph showing an input revolutions-per-minute (RPM) value for an electric oil pump and a response graph, according to various exemplary embodiments of the present invention.

As illustrated in FIG. 11 and Equation 1, according to various exemplary embodiments of the present invention, a pulse is input to the RPM of the EOP 30 in a form of a sinusoidal wave.

$$RPM = RPM + \alpha \sin(\beta T) \qquad \text{[Equation 1]}$$

where α and β are set according to the current RPM, the temperature of the drive motor 100, and the temperature of oil, and T is time. Here, α is an amplitude of the sinusoid. β is a frequency of the sinusoid and can be used to change a period of the sinusoid. In an exemplary embodiment of the present invention, a may be set based on parameters including a current RPM of the EOP, a current temperature of the drive motor 100, and a current oil temperature. In the same manner, β may be set based on the parameters including the current RPM of the EOP, the current temperature of the drive motor 100, and the current oil temperature. For instance, the amplitude, α, can be increased, the frequency, β, can be increased, or both.

The sinusoidal waves may be input continuously or intermittently. When the sinusoidal pulses are input, an oil flow path may be changed due to the fluctuation of oil and the oil can reach the entire area of the drive motor 100, including a weak cooling area of the drive motor. In other words, the overheating problem caused by the weak cooling area that occurs due to a fixed oil flow path may be solved.

Figure 12:
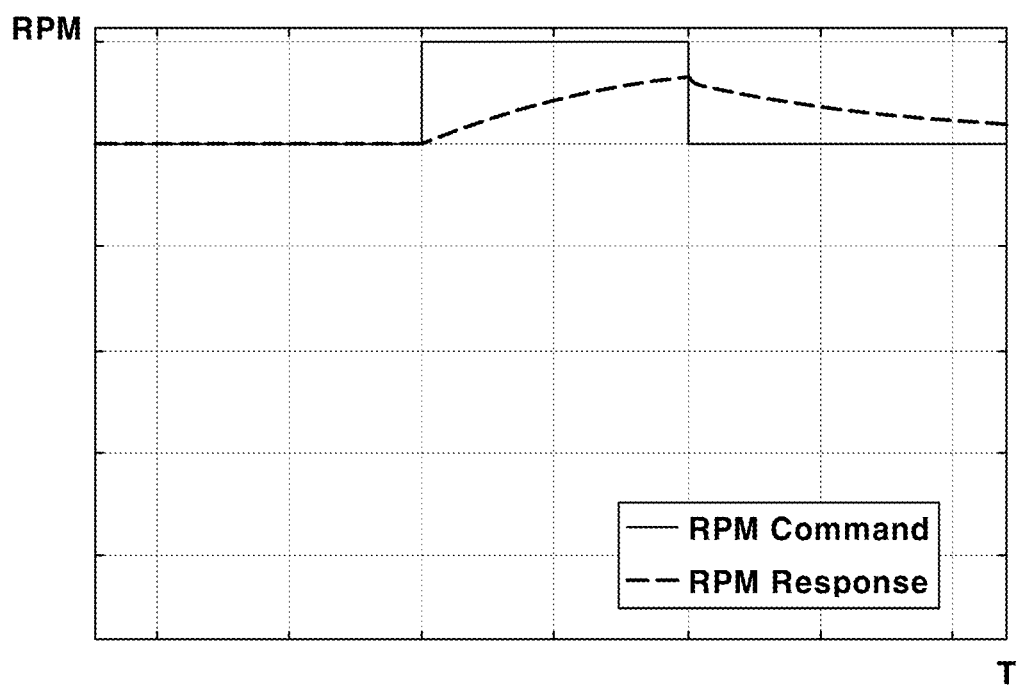
FIG. 12 is a pulsation graph showing an input RPM value for an electric oil pump and a response graph, according to various exemplary embodiments of the present invention.

According to various exemplary embodiments of the present invention, a pulse is input to the RPM of the EOP 30 in a form of a square wave or a pulse wave, as illustrated in FIG. 12 and Equation 2.

$$RPM = RPM + C \qquad \text{[Equation 2]}$$

where C is 1 or 0.

For example, C=1 is applied for one second and C=0 is applied for three seconds. The present cycle may be repeated one or more times.

When the input pulse is a square wave, the oil flow path may be changed due to the pulse supply. At the same time, the control logic may be simplified as determination of the sinusoidal wave is not required.

The effects provided by a method of controlling an electric oil pump configured for a vehicle, according to various exemplary embodiments of the present invention, will be described below.

Conventionally, in a high current or Hill-Hold situation, RPMs of an EOP were arranged for each temperature and the EOP was driven according to the arranged RPM and the temperature without considering change of a weak cooling area within the drive motor. On the other hand, the present invention improves the cooling performance in the weak cooling area that changes when a vehicle operates on a sloped road by controlling the EOP to perform an additional operation control. Therefore, the control method of the present invention can solve the problems of local overheat-induced damage in the weak cooling area of the drive motor and demagnetization of a permanent magnet.

When the temperature of the drive motor rises, the EOP is controlled to increase the feed rate so that the cooling performance is improved. Even in the present circumstance, the weak cooling area which is difficult to be reached by oil appears to be at a lower portion of the drive motor because the oil flow path in the drive motor is fixed and oil falls due to the gravity. However, according to various exemplary embodiments of the present invention, since flow by the EOP is varied by applying a varied input, such as the sinusoidal wave, the oil flow path changes and a pulsation occurs in the oil flow, facilitating the oil to enter the weak cooling area. In other words, cooling of the weak cooling area that shows up in the drive motor may be improved.

When the temperature detects a temperature higher than a predetermined upper limit of a tolerable temperature range during operation of the vehicle, derating is performed to prevent the vehicle and the drive motor from overheating. The present invention can prevent the drive motor from suffering derating by improving the cooling performance in the weak cooling area which occurs in the drive motor, ensuring a stable driving performance of the vehicle.

Furthermore, the present invention can secure safety of the drive motor from overheat-induced damage or demagnetization when the vehicle drives on a sloped road. In a case of a conventional EOP control technique, when a weak cooling area changes in the drive motor while a vehicle drives on a sloped road, since the weak cooling area is insufficiently cooled and the temperature of the weak cooling area cannot be detected, the derating is performed belatedly, resulting in overheat-induced damage or demagnetization of the drive motor. However, according to various exemplary embodiments of the present invention, since the changed weak cooling area may be sufficiently cooled, the driver motor may be protected from overheating even in a case where an overheating protection derating logic malfunctions.

To prevent overheat-induced damage to a weak cooling area which changes when a vehicle drives on a sloped road, there is a method of mounting additional temperature sensors at a plurality of positions. However, in the instant case, increase in costs is inevitable. According to various exemplary embodiments of the present invention, since additional temperature sensors are not required, an advantage such as cost saving is obtained.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed wen the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an electric oil pump of a vehicle, the method comprising:
   determining, by a controller, whether the vehicle has entered a sloped road;
   determining, by the controller, whether a drive motor of the vehicle is in at least one overheatable condition upon determining that the vehicle has entered the sloped road;
   determining, by the controller, whether the at least one overheatable condition is maintained over a preset reference time upon determining that the vehicle is in the at least one overheatable condition; and supplying, by the controller, a pulse to an input of a revolutions per minute (RPM) in the electric oil pump upon determining that a duration of the at least one overheatable condition exceeds the preset reference time.

2. The method according to claim 1, wherein the pulse is input as a sinusoidal wave or a square wave.

3. The method according to claim 2, wherein, when the pulse is input as the sinusoidal wave, the RPM is determined according to an equation 1, $$RPM = RPM + \alpha \sin(\beta T), \quad \text{[Equation 1]}$$

where $\alpha$ and $\beta$ are set according to a current RPM, a temperature of the drive motor, and a temperature of oil in an oil cooling system including the electric oil pump and the drive motor.

4. The method according to claim 1, wherein the controller is configured for determining that the vehicle has entered the sloped road, upon determining that an inclination angle of the vehicle to a horizontal level exceeds a preset reference angle.

5. The method according to claim 1, wherein the at least one overheatable condition includes a state in which a drive current of the drive motor exceeds a preset reference current.

6. The method according to claim 5, wherein when the drive motor is a three-phase motor, the at least one overheatable condition includes a state in which a maximum current value of the three-phase motor exceeds the preset reference current.

7. The method according to claim 1, wherein the at least one overheatable condition is determined according to a current speed of the vehicle and a current torque of the vehicle.

8. The method according to claim 7, wherein the at least one overheatable condition includes a state in which the current speed of the vehicle is under a predetermined speed and the current torque of the vehicle exceeds a torque which is determined from the current speed of the vehicle.

9. The method according to claim 8, wherein the at least one overheatable condition includes a state in which a location of a coil currently having a maximum phase current among coils wound around the drive motor coincides with a weak cooling area generated when the vehicle is driven on the sloped road.

10. The method according to claim 9, wherein upon determining that the location of the coil currently having the maximum phase current coincides with the weak cooling area, the preset reference time is reset by the controller to a value which is smaller than an initially set reference time and is greater than zero second.

11. The method according to claim 10, wherein the preset reference time is reset as a half of the initially set reference time.

12. The method of claim 1, wherein the controller includes:
a processor; and
a non-transitory storage medium on which a program for performing the method of claim 1 is recorded and executed by the processor.

13. A non-transitory computer readable storage medium on which a program for performing the method of claim 1 is recorded.

14. An oil cooling system for a vehicle, the oil cooling system comprising:
a drive motor fiducially-connected to a heat exchanger;
an oil pump fiducially-connected to the heat exchanger;
a drive motor temperature sensor configured for measuring a temperature of the drive motor,
an oil temperature sensor configured for measuring a temperature of oil in the oil cooling system; and
a controller electrically connected to the drive motor, the oil pump, the drive motor temperature sensor and the oil temperature sensor,
wherein the controller is configured for determining whether the vehicle has entered a sloped road,
wherein the controller is configured for determining whether the drive motor of the vehicle is in at least one overheatable condition upon determining that the vehicle has entered the sloped road,
wherein the controller is configured for determining whether the at least one overheatable condition is maintained over a preset reference time upon determining that the vehicle is in the at least one overheatable condition, and
wherein the controller is configured for supplying a pulse to an input of a revolutions per minute (RPM) in the oil pump upon determining that a duration of the at least one overheatable condition exceeds the preset reference time.

15. The oil cooling system of claim 14, wherein the pulse is input as a sinusoidal wave or a square wave.

16. The oil cooling system of claim 14, wherein the controller is configured for determining that the vehicle has entered the sloped road, upon concluding that an inclination angle of the vehicle to a horizontal level exceeds a preset reference angle.

17. The oil cooling system of claim 14,
wherein the at least one overheatable condition includes a state in which a drive current of the drive motor exceeds a preset reference current.

18. The oil cooling system of claim 14,
wherein the at least one overheatable condition includes a state in which a current speed of the vehicle is under a predetermined speed and a current torque of the vehicle exceeds a torque which is determined from the current speed of the vehicle.

19. The oil cooling system of claim 18,
wherein the at least one overheatable condition includes a state in which a location of a coil currently having a maximum phase current among coils wound around the drive motor coincides with a weak cooling area generated when the vehicle is driven on the sloped road.

20. The oil cooling system of claim 19, wherein upon determining that the location of the coil currently having the maximum phase current coincides with the weak cooling area, the controller is configured for resetting the preset reference time to a value which is smaller than an initially set reference time and is greater than zero second.

* * * * *